No. 632,502. Patented Sept. 5, 1899.
E. MONNIER.
VALVE.
(Application filed June 8, 1899.)
(No Model.)
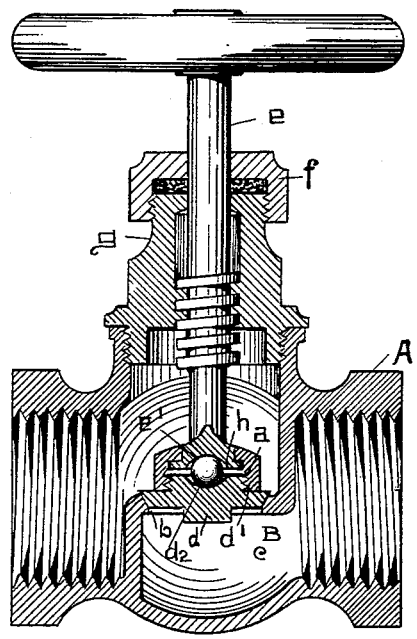
WITNESSES
Chas. E. Wisner
May E. Kott
INVENTOR
Edward Monnier
By Parker & Burton
Attorneys.

UNITED STATES PATENT OFFICE.

EDWARD MONNIER, OF DETROIT, MICHIGAN.

VALVE.

SPECIFICATION forming part of Letters Patent No. 632,502, dated September 5, 1899.

Application filed June 8, 1899. Serial No. 719,774. (No model.)

*To all whom it may concern:*

Be it known that I, EDWARD MONNIER, a citizen of the United States, residing at Detroit, county of Wayne, State of Michigan, have invented a certain new and useful Improvement in Valves; and I declare the following to be a full, clear, and exact description of the invention, such as will enable others skilled in the art to which it pertains to make and use the same, reference being had to the accompanying drawings, which form a part of this specification.

This invention relates to valves, and has for its object an improved connection between the valve and the valve-stem, by means of which the valve is forced to its seat directly and without turning or grinding in its seat, and both the valve and the seat of the structure embodying this invention wear much longer and remain in accurate fit one with the other for a much longer period of time than has been the case with valves heretofore constructed.

A indicates the casing of an ordinary globe-valve, of which B indicates the perforated diaphragm, with the valve-seat $b$ bounding the orifice $c$.

$d$ indicates a valve, and $e$ indicates a valve-stem. The valve-stem $e$ passes through a packing-box $f$ and through the cap $g$, in which there is a hollow screw that engages with screw-threads on the valve-stem $e$. At that end of the valve-stem which is adjacent to the valve $d$ is a cavity, and the stem terminates with a collar $h$, over which engages a threaded coupling $a$. The back of the valve $d$ is provided with a threaded coupling-neck $d'$, on which engages the threaded coupling $a$. The coupling-neck $d'$ is provided with a central cavity that registers with the cavity in the end of the valve-stem $e$. In the hollow made by the two cavities $e'$ and $d^2$ is inserted a ball whose radius is slightly less than the radius of the curvature of either of the cavities; but each of the cavities is slightly less than a hemisphere, so that the inserted ball holds the stem spaced from the valve a slight distance, and the valve can accommodate itself to any slight irregularity that may exist either in the true centering of the stem or in the perfect rectangle between the stem and the valve-seat. When the valve $d$ is pushed to its seat by turning the stem down through the screw, the stem turns without forcing the valve to travel with it after the valve has once come in contact with the seat. The large frictional surfaces between the valve and its seat arrest the rotary motion of the valve, which is only actuated in turning by the small bearing-surfaces between the top of the ball and the valve-stem and the bottom of the ball and the valve.

Experimentally I have found that this construction will outwear six or seven times a valve constructed without the ball-bearing and in which the end face of the valve-stem bears against the opposed end face of the threaded neck of the valve.

What I claim is—

1. In combination with a valve, a valve-stem made separate therefrom and provided with a collar $h$, a ball interposed between the stem and the valve, and a coupling arrangement to engage over the collar and hold the stem to the valve, substantially as described.

2. In combination with a valve provided with a threaded neck having a cavity therein, a valve-stem having at its end a collar and provided with a cavity arranged to register with the cavity in the neck of the valve, a coupling arranged to hold the parts together, and a ball interposed between the valve and the stem in said cavity, substantially as described.

In testimony whereof I sign this specification in the presence of two witnesses.

EDWARD MONNIER.

Witnesses:
JOHN N. GOODRICH,
CHARLES F. BURTON.